F. M. LEAVITT.
APPARATUS FOR USE IN THE PURIFICATION OF WATER.
APPLICATION FILED JULY 24, 1913.
1,087,958.
Patented Feb. 24, 1914.
2 SHEETS—SHEET 1.
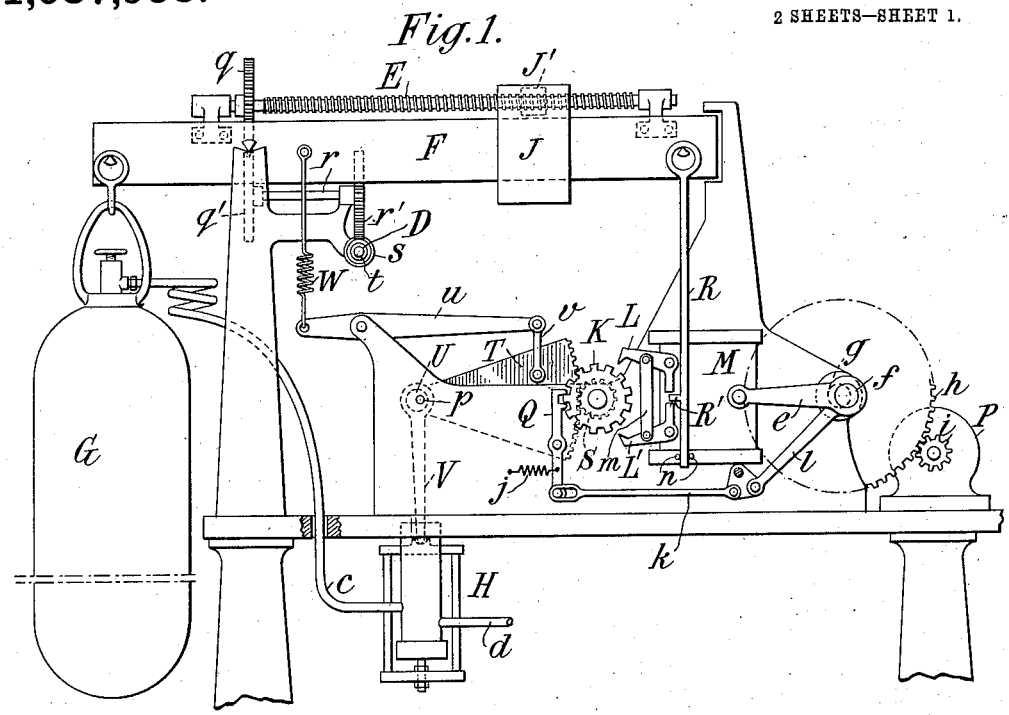
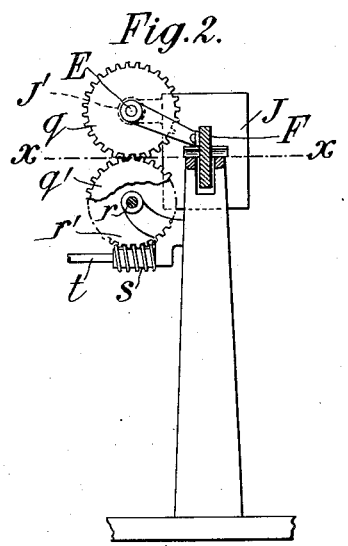
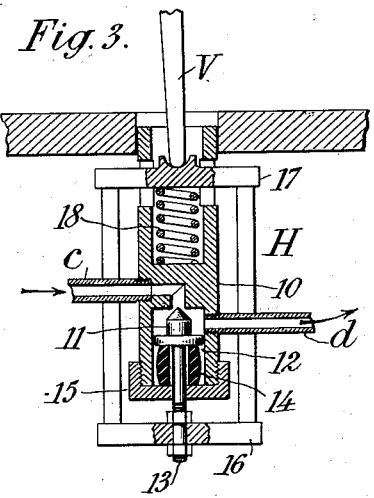
WITNESSES:
René Muine
Fred White
INVENTOR:
Frank M. Leavitt,
By Attorneys,
Chaser, Dark & Meyers F. M. LEAVITT.
APPARATUS FOR USE IN THE PURIFICATION OF WATER.
APPLICATION FILED JULY 24, 1913.

1,087,958.

Patented Feb. 24, 1914.

2 SHEETS—SHEET 2.

WITNESSES:
René Pruine
Fred White

INVENTOR
Frank M. Leavitt,
By Attorneys,
Fraser, Dark & Myers

UNITED STATES PATENT OFFICE.

FRANK M. LEAVITT, OF SMITHTOWN, NEW YORK, ASSIGNOR TO LEAVITT-JACKSON ENGINEERING COMPANY, OF BROOKLYN, NEW YORK, A CORPORATION OF NEW YORK.

APPARATUS FOR USE IN THE PURIFICATION OF WATER.

1,087,958. Specification of Letters Patent. Patented Feb. 24, 1914.

Application filed July 24, 1913. Serial No. 780,954.

*To all whom it may concern:*

Be it known that I, FRANK M. LEAVITT, a citizen of the United States, residing at Smithtown, in the county of Suffolk and State of New York, have invented certain new and useful Improvements in Apparatus for Use in the Purification of Water, of which the following is a specification.

In the purification of water, as in an aqueduct for example, and of other liquids such as sewage, it is common to use chlorin or other gaseous or fluid agent, which is introduced into the water or other liquid in some predetermined proportion. Inasmuch as the flow in the water supply or other liquid current is subject to frequent fluctuation, it is necessary to vary the flow of the purifying agent in like manner, in order to maintain its introduction in the prescribed proportion.

My present invention provides an apparatus for introducing a gaseous or other purifying agent into a stream of water or other liquid at a rate varying proportionately to the variations in the flow of such liquid, and at a rate independent of variations in pressure or temperature of the agent, so that for any given quantity of water flowing a given weight of the chemical agent shall be introduced.

In my application Serial No. 724,512 filed October 8, 1912, I have described and claimed a method of controlling the flow whereby to accomplish the result just stated, and have shown an apparatus adapted to carry out such method, and to illustrate the principle involved in my invention. The present application illustrates an improved and simplified apparatus adapted to perform the required process.

Figure 4:
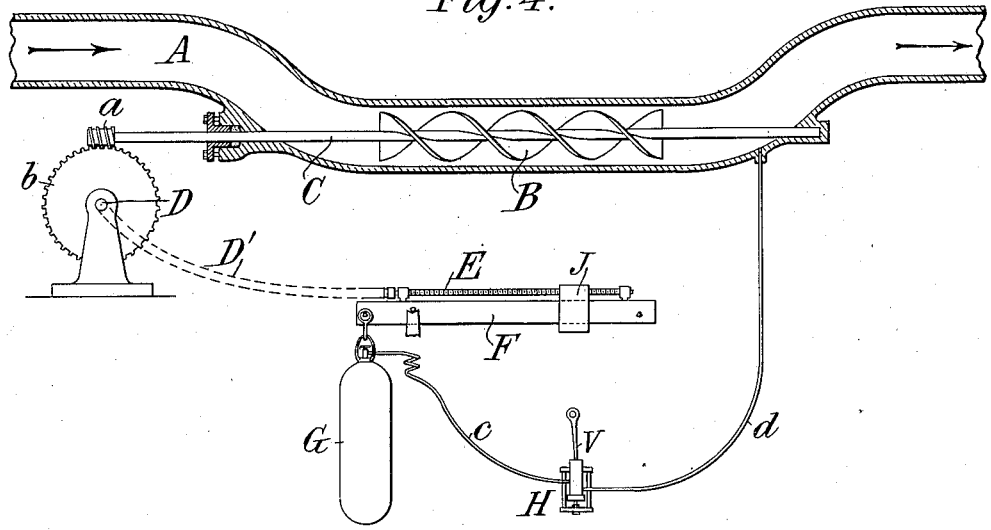
Figure 5:
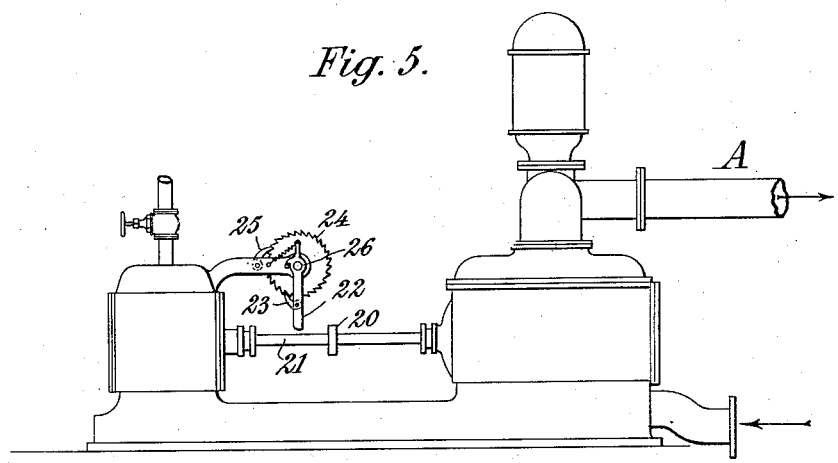

In the accompanying drawings,—Figure 1 is a side elevation of the apparatus, being partly in vertical section; Fig. 2 is a transverse section thereof; Fig. 3 is a section on a larger scale of the valve shown in Fig. 1; Fig. 4 is a diagrammatic view illustrating the connection of the fluid controlling apparatus with the water main or aqueduct; Fig. 5 is an elevation of a pump showing a modified arrangement.

For the purification of water supplied to cities, in order to destroy harmful bacteria in the water, the purifying agent now most commonly used is chlorin gas. This gas is introduced into the water at a given rate, say for example one pound of chlorin to two million gallons of water. Such chlorin gas is stored in steel bottles or flasks under pressure in liquid form; when the outlet valve from a bottle is opened the liquid is partly relieved of pressure and the gaseous chlorin passes out through a tube into the water main. For controlling its rate of flow a valve is introduced in this tube, and it is for the operation of this valve that the present apparatus is designed.

Referring first to Fig. 4 of the drawings, A designates an aqueduct or water main through which passes the water to be purified; or it may be a branch or loop from the main aqueduct. In connection with this main some sort of device is employed which moves in proportion to the flow of water through the main. This device I will call a "flow indicator". Many such devices are known, the one example shown comprising an Archimedean screw B turned by the flow of water in the main, rotating a shaft C, which through worm or other gearing $a$ $b$ communicates reduced rotation to a shaft D and thence in any suitable way to the controller shown in Fig. 1, as for example by a flexible shaft D' which slowly rotates a screw E carried by a scale beam F, from one arm of which is supported the bottle G containing the chlorin or other gas. From the outlet valve of this bottle the gas flows by a pipe or tube $c$ to a valve H, and thence by a tube $d$ to the main or aqueduct A, where the gas is introduced into the flow of water.

It being required to control the flow of gas with reference to its weight so that under given conditions of flow of water to be purified a given weight of gas may escape during each unit of time and be directed into the water, it is necessary to provide some means for weighing the gas contained in the bottle G. In the construction shown in my previous application this bottle was supported upon a float in one instance, or suspended from springs in another example, so that in either case the support for the bottle would rise as the weight within it diminished. In the preferred construction here shown the bottle is hung upon a scale beam F whereby it is weighed by means of a counterweight J which slides along this scale beam.

At the beginning of the operation when the bottle G is full of gas and has its maximum weight, the counterweight J is at the extreme end of the beam. The proportions should be such that the counterweight may slightly overpoise the bottle. The rotation of the shaft by its engagement with the nut J' carried by the counterweight, slowly displaces the latter toward the pivot of the beam.

The rate of movement of the counterweight is important. Its extreme movement from the outer to near the inner end of the scale beam corresponds to the entire weight of gas contained in the bottle G; hence its movement proportionate to a given flow of water should be at such rate that the quantity of water requiring the given weight of chlorin will flow through the aqueduct while the counterweight is executing its extreme travel. For example, if the normal flow is one million gallons per hour and the prescribed dosage is one pound of chlorin to each million gallons of water, and if the bottle for example contains 60 pounds of chlorin, the gearing ratio should be such between the flow indicator B and the shaft E that the counterweight will be caused to execute its total travel in 60 hours. In this example a uniform flow of water is assumed; but in actual practice the flow of water will vary greatly, and as the indicator B will move at a proportionate rate, the progress of the counterweight J will be more or less rapid in exact proportion to the rate of flow of water.

The outflow of gas to the aqueduct is governed by the valve H, and this valve is operated in such manner as to maintain such an outflow of gas as to cause the supply of gas to lose weight in proportion to the rate of travel of the counterweight, that is to say, in proportion to the variations in flow of water through the main. If the diminution in weight of the bottle due to the outflow of gas is precisely the same as the diminution of effective weight of the counterweight due to its travel, the valve is at the ideal opening and remains unaffected. If, however, the counterweight preponderates owing to the outflow of gas having been too great, the valve is partially closed by the mechanism to be described. If on the contrary the weight of the bottle preponderates because the outflow of gas has been too slow, the valve is automatically opened wider until a sufficient outflow occurs to establish an equilibrium between the bottle and counterweight. How these results are attained will be apparent from a description of the mechanism shown in Fig. 1.

A double ratchet wheel K is adapted to be turned in either direction by pawls L L' carried on a reciprocating slide M, which is reciprocated from any suitable source of power, as for example by being connected by a link e to an eccentric f on a shaft g which is turned by a gear h which is driven by a pinion i on the shaft of an electromotor P or other source of motion. The wheel K when not being advanced by either pawl L or L', is held stationary by a stop arm Q pressed into engagement with it by a spring j, and pulled out of engagement by rods k l, the latter connected with the same eccentric f but at a different angle, so that the eccentric acts to pull the stop Q out of engagement with the teeth of the ratchet K before it advances the slide sufficiently to bring either pawl L or L' into action against a tooth of said ratchet. The pawls L L' are normally in the position shown, so that neither pawl can act upon the ratchet wheel, and they are connected by a link m. A rod R is hung from the scale beam F so as to rise and fall with the beam, being guided at its lower end between stationary guides n n. It carries a projection R' which in the poised position of the beam stands at a point between the approaching tails of the two pawls L L'. So long as the scale beam remains poised the slide M may reciprocate the pawls without either pawl striking the projection R'. If, however, the scale beam rises or falls it lifts or lowers the projection R', so that at the next backward movement of the slide M the tail of one pawl strikes the projection, thereby tilting this pawl outwardly or away from the ratchet wheel, and through the link m bringing the other pawl inwardly, so that at the ensuing forward stroke of the slide the nose of the latter pawl engages a notch of the wheel and turns the latter one tooth. This operation will be repeated so long as the scale beam is out of poise; but upon its returning to poise the projection R' is restored to the position shown and the pawls are brought back to their inactive position. After each movement of the ratchet the stop Q reëngages with it and holds it against false movements. The ratchet K carries a pinion S which gears when a toothed sector T turning on a pivot p and carrying an eccentric U which operates a rod V, which in turn operates the valve H, so that as it is pushed down by the eccentric it opens the valve, and vice versa.

For operating the screw shaft E it carries a gear q meshing with a gear q' on a shaft r carrying a worm wheel r' which meshes with a worm s on a shaft t which derives motion from the flow indicator, and may be the same shaft as D or D' in Fig. 1. The centers and pitch lines of the gears q q' coincide with the pivotal axis x (Fig. 2) of the scale beam, as shown, so that the rocking of the beam may not impair the transmission of motion, and so that the thrust imparted to the screw E through the gearing may not have a disturbing effect on the scale beam.

The preferred construction of valve is shown in detail in Fig. 3. A stationary valve casing 10 has an inlet opening communicating with the tube c and terminating in a seat for the valve 11, which is a cone or tappet valve, and works in a chamber 12 from which there is a free outflow through the tube d. A valve stem 13 extends out through a stuffing box which is best constructed as a tubular block 14 of rubber inclosing the stem and compressed between the valve head and the lower head 15 of the shell. The stem 13 is connected by a yoke 16 to a frame which terminates in a cross head 17 at the top, which is pressed upwardly by a spring 18 and engages with the rod V which presses downwardly upon it against the stress of the spring to open the valve. When the rod V rises, the spring pressing up on the head 17 forces the valve 11 to its seat. When the eccentric forces down the rod V it pushes the valve down against the spring. The movements of the valve are very slight, so that the eccentric U requires only a short radius.

In commencing the operation, the counterpoise J is moved to its outermost position on the scale beam, and a full bottle G of gas is hung upon the beam and connected to the tube c. Thereupon the rotation of the screw E proportional to the movement of the flow indicator, causes the counterweight to travel toward the pivot of the beam. If at any instant the counterpoise overbalances the bottle, the scale descends and the ratchet mechanism described turns the parts K, T, U in such direction as to raise the rod V and move the valve toward its seat. If the bottle outweighs the counterpoise the beam rises and the contrary operation ensues, thereby opening the valve wider. Hence whenever the outflow of the gas from the bottle is at a rate insufficient to cause the bottle to lose weight at the same rate that the effective weight of the counterpoise diminishes, the valve is automatically opened wider; and whenever the outflow becomes so rapid that the bottle loses weight faster than the loss of effective weight due to the movement of the counterweight, the valve is partially closed. Thus the valve mechanism tends to move the valve to its position of ideal opening at which it passes through it such amount of gas that the loss of weight of the bottle precisely keeps pace with the loss of effective weight of the counterweight. Hence such a flow of gas is insured as will introduce into the stream of water per unit of time a given weight of gas proportionate to a given volumetric flow of water.

The operation will occur as described if the scale beam be so mounted as to move with extreme sensitiveness. With a less sensitive scale beam an over-compensation or "pumping" action is liable to occur. Thus if the feed of gas is too slow the beam will rise, thus starting the valve to open wider; but as the gas feeds slowly it will require an appreciable time for the loss of weight of gas to again bring the beam to mid-position, and during this time the valve will be continuously opening wider so that the flow will become excessive. The beam will then fall and the process be reversed, the valve then being closed too much, thereby diminishing the flow unduly. It is found in practice that at a very low rate of feed the valve will over-run from the fully closed to the fully open position, and vice versa. To overcome this defective action, I provide a compensator which will now be described.

A spring W of suitable strength is connected to the long arm of the beam, and at the opposite end is connected to the valve mechanism, preferably by being attached to one arm of a lever u, the other and longer arm of which is connected by a link v to the sector T. The tension of the spring W pulling down on the beam becomes part of the force which counterweights the bottle and gas. When the beam is poised the weight of the bottle and gas is balanced by the counterweight plus the mean tension of the spring. If the beam rises, thus starting the valve to open wider, the movement imparted from sector T through lever u increases the tension of the spring, and thus pulls the beam back toward its mid position without waiting for this to be done by the loss of weight of gas from the bottle. But as the valve has already been opened wider the flow of gas is faster; if, however, not fast enough to keep up with the rate of travel of the counterweight, the same process is repeated until the flow of gas comes into correct ratio to the travel of the counterweight. This compensating means is found in practice to entirely overcome the difficulty above described, and the device is so sensitive that the rate of travel of the counterweight may be widely varied according to extreme conditions of flow of the water, and yet the mechanism will maintain the rate of flow of the gas so nearly in unison therewith that the beam never tilts far enough to reach either of its stops, but remains poised at about its mid-position.

Instead of controlling the rate of travel of the counterweight by means of a flow indicator, the travel of the counterweight may be otherwise governed to cause it to keep pace with the varying flow of water. As one example, I show in Fig. 5 a steam pump by which the flow through the aqueduct or main is caused, and a connection with this pump whereby it serves to drive the shaft which turns the propelling screw E. In Fig. 5 a tappet 20 on the piston rod 21 strikes at each stroke a lever 22 carrying a pawl 23 which turns a ratchet-wheel 24, the latter being held from turning backward by a stop pawl 25. The shaft 26 of this ratchet wheel may take the place of the shaft C in Fig. 4, or of any of the moving parts intervening between that shaft and the screw E. Thus the screw E propelling the counterweight moves at a rate proportioned to the varying speed of the pump, and hence the counterweight travels at a rate proportioned to the flow of water in the main A.

The apparatus may be varied in many respects without departing from the essential features of the invention. It will be understood that the use of a screw B as a means responding to the flow of water, as shown in Fig. 1, or the utilization of the pump as shown in Fig. 5, are merely examples of means by which the counterweight may be caused to travel at a rate proportionate to the flow of the water.

The described mechanism is applicable wherever a chemical agent in gaseous or liquid form is to be caused to flow into a current of water or other liquid so as to introduce a given weight of the agent, irrespective of its pressure or temperature, into a given volume of the water or other liquid to be treated or purified.

The described mechanism may serve other uses than for controlling the flow of a purifying agent.

I claim as my invention:—

1. A means for controlling the flow of a fluid from a supply thereof irrespective of its volume or pressure, comprising means responsive to the weight of such fluid supply and controlling means actuated by such means, to control the flow of the fluid, substantially as described.

2. A means for controlling the flow of a fluid irrespective of its volume or pressure, and relatively to a stream of liquid, comprising means responsive both to the weight of said fluid and to the rate of flow of said liquid, and means actuated thereby adapted to control the flow of the fluid, whereby to pass a given weight of such fluid to a given amount of flow of such liquid substantially as described.

3. A means for controlling the flow of a fluid relatively to a stream of liquid, comprising means responsive to the rate of flow of said liquid, means responsive to the weight of a supply of said fluid, a valve controlling the flow of said fluid, and means for operating said valve governed by both said first named means substantially as described.

4. A means for controlling the flow of a fluid relatively to a stream of liquid, comprising weighing means responsive to the weight of the supply of said fluid, propelling means movable relatively to the rate of flow of said liquid, a valve controlling the flow of said fluid, and operating means for said valve governed by both said weighing means and said propelling means.

5. A means for controlling the flow of a fluid relatively to a stream of liquid, comprising weighing means including a counterpoising element responsive to the weight of the supply of said fluid, a valve controlling the flow of said fluid governed by said weighing means, and means responsive to the rate of flow of said liquid for progressively diminishing the effect of the counterpoising element of said weighing means.

6. A means for controlling the flow of a fluid relatively to a stream of liquid, comprising weighing means including a counterpoising element responsive to the weight of the supply of said fluid, means responsive to the rate of flow of said liquid acting upon counterpoising element to progressively diminish its counterpoising effect, a valve controlling the flow of said fluid, and means for opening or closing said valve governed by said weighing means.

7. A fluid controlling device comprising a weighing means including a counterpoising element responsive to the weight of the supply of said fluid, means for progressively diminishing the effect of such counterpoising element, a valve controlling the flow of said fluid, means movable in either direction to open or close said valve, and governing means therefor actuated by said weighing means.

8. Mechanism for controlling the flow of fluid from a receptacle thereof, comprising a scale for weighing said receptacle having a counterpoise, means for progressively shifting the counterpoise of said scale, a valve, operating means for opening or closing said valve, mechanical means for displacing said operating means in either direction, and means in connection with the scale for controlling said mechanical means, whereby when the fluid receptacle overweighs the scale said valve will be opened wider, and vice versa.

9. Mechanism for controlling the flow of fluid from a receptacle thereof, comprising a scale for weighing said receptacle having a counterpoise, means for progressively shifting the counterpoise of said scale, a valve, operating means for opening or closing said valve, a motor for driving said operating means, and controlling means whereby said operating means is governed from the scale.

10. The combination with a scale, of a valve, and operating means for the latter controlled from said scale, comprising a ratchet wheel connected to the valve, pawls for turning said wheel in either direction, power driven means for reciprocating said pawls, and a controlling part responding to the movements of the scale for bringing said pawls to active or inactive positions.

11. The combination with a scale, of a valve, and operating means for the latter controlled from said scale, comprising a ratchet wheel connected to the valve, pawls for turning said wheel in either direction, power driven means for reciprocating said pawls, a stop for holding said wheel during the period of inaction of the pawls operated from said power driven means, and a controlling part responding to the movements of the scale for bringing said pawls to active or inactive positions.

12. The combination of a scale comprising a beam, a counterpoise movable along said beam, a screw shaft on said beam for so moving said counterpoise, and ears for turning said screw shaft having their meshing points coincident with the pivotal axis of the scale beam, with a valve and operating means therefor controlled from said scale beam.

13. Mechanism for controlling the flow of a fluid, comprising weighing means, a valve, operating means for said valve controlled from said weighing means, and compensating means interposed between said operating means and the weighing means and adapted to oppose excessive movements of the valve.

14. Mechanism for controlling the flow of a fluid, comprising a weighing scale responding to the weight of a suply of said fluid, a valve controlling the flow of said fluid, operating means for said valve controlled by said scale, and compensating means interposed between said operating means and scale and adapted upon an opening movement of the valve to diminish the effective weight of the supply of fluid, and vice versa, whereby to oppose excessive movements of the valve.

In witnesses whereof, I have hereunto signed my name in the presence of two subscribing witnesses.

FRANK M. LEAVITT.

Witnesses:
 THOMAS F. WALLACE,
 FRED WHITE.